(12) United States Patent
McHenry et al.

(10) Patent No.: US 6,550,832 B2
(45) Date of Patent: Apr. 22, 2003

(54) ACTUATOR

(75) Inventors: William J. McHenry, Wyoming, RI (US); Jason L. Williams, Glocester, RI (US)

(73) Assignee: Mentor Group, LLC, West Linn, OR (US)

( * ) Notice: Subject to any disclaimer, the term of this patent is extended or adjusted under 35 U.S.C. 154(b) by 0 days.

(21) Appl. No.: 09/918,658

(22) Filed: Jul. 30, 2001

(65) Prior Publication Data

US 2003/0020286 A1 Jan. 30, 2003

(51) Int. Cl.⁷ .................................................. F05B 3/00
(52) U.S. Cl. ...................... 292/336.3; 292/152; 292/145
(58) Field of Search ................................... 792/145, 147, 792/150, 152, 153, 143, 173, 236.3; 30/162, 125; 137/493.3, 527.6; 166/321

(56) References Cited

U.S. PATENT DOCUMENTS

| | | | |
|---|---|---|---|
| 436,888 A | 9/1890 | Von Bultzingslowen et al. | |
| 821,176 A | 5/1906 | Leland | |
| 969,909 A | 9/1910 | Schrade | |
| 1,179,111 A | 4/1916 | Knowlton | |
| 1,258,150 A | 3/1918 | Schrade | |
| 1,413,954 A | 4/1922 | Ball et al. | |
| 1,888,887 A | * 11/1932 | Readman | 30/162 |
| 2,197,136 A | 4/1940 | Share et al. | |
| 2,580,495 A | * 1/1952 | Woods | 24/654 |
| 2,681,244 A | 6/1954 | Noecker | |
| 3,192,624 A | * 7/1965 | Gringer | 30/162 |
| 3,313,564 A | 4/1967 | Pultz | |
| 3,496,590 A | 2/1970 | Yates | |
| 3,990,471 A | * 11/1976 | Schutzer et al. | 137/527 |
| 4,005,525 A | * 2/1977 | Gringer | 30/125 |
| 4,200,977 A | * 5/1980 | Kageyama et al. | 30/162 |
| 4,277,888 A | * 7/1981 | Szabo | 30/162 |
| 4,354,313 A | 10/1982 | Naifeh | |
| 4,407,538 A | 10/1983 | Bauer | |
| 4,447,950 A | 5/1984 | Mizelle | |
| 4,663,845 A | * 5/1987 | Weimann | 30/162 |
| 4,860,790 A | * 8/1989 | Scaramucci | 137/527 |
| 4,939,839 A | * 7/1990 | Gorst | 30/125 |
| 4,985,998 A | 1/1991 | Howard | |
| 5,104,164 A | * 4/1992 | Sieg | 292/336.3 |
| 5,515,610 A | * 5/1996 | Levin et al. | 30/161 |
| 5,546,662 A | 8/1996 | Seber et al. | |
| 5,581,890 A | * 12/1996 | Schmidt | 30/162 |
| 5,621,973 A | 4/1997 | Seber et al. | |
| 5,737,841 A | 4/1998 | McHenry et al. | |
| 5,875,552 A | 3/1999 | Chen | |
| 5,909,930 A | * 6/1999 | Ragland et al. | 30/125 |
| 6,122,829 A | 9/2000 | McHenry et al. | |
| 6,223,628 B1 | * 5/2001 | Barron | 294/106 |
| 6,226,873 B1 | * 5/2001 | Okumura | 30/162 |
| 6,269,993 B1 | * 8/2001 | Ebejer et al | 224/674 |
| 6,393,628 B1 | * 5/2002 | Kellogg | 4/490 |

\* cited by examiner

*Primary Examiner*—Anthony Knight
*Assistant Examiner*—Mark Williams
(74) *Attorney, Agent, or Firm*—ipsolan llp

(57) ABSTRACT

An actuator mechanism is defined by a lever arm that is integrally connected to resilient spring members. The lever arm is movable between first and second positions and is normally biased into the first position in which the actuator may engage an adjacent member, for example to provide a fluid-tight sealing relationship of to lock the adjacent member in a stationary position relative to the lever arm. Movement of the lever arm into the second position releases the engagement with the adjacent member. In one embodiment the actuator is defined by a pair of overlapping, oppositely oriented slots cut into a monolithic member to define both the lever arm and the spring members. The lever arm rocks in a teeter-toter fashion when actuated and both ends of the lever arm can be utilized to perform work.

24 Claims, 6 Drawing Sheets

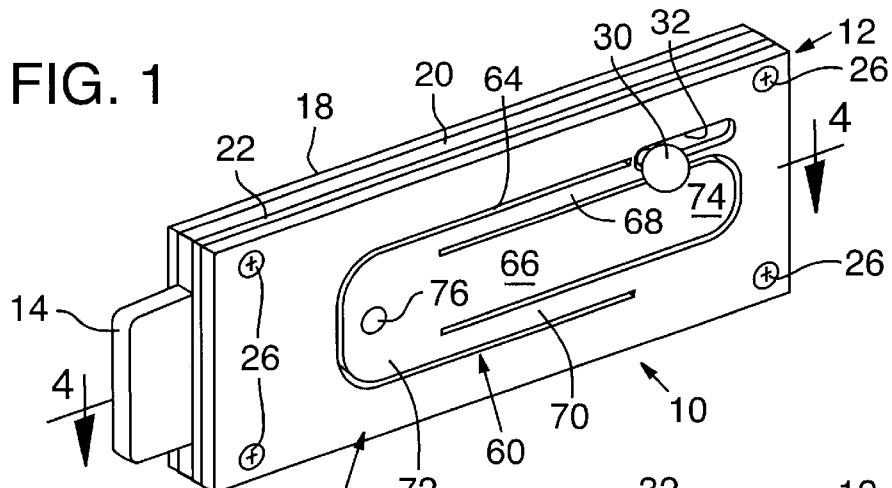
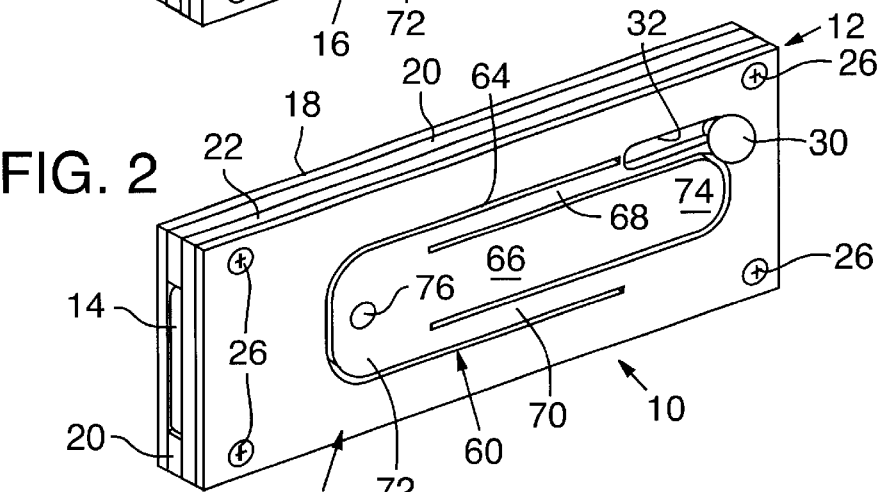
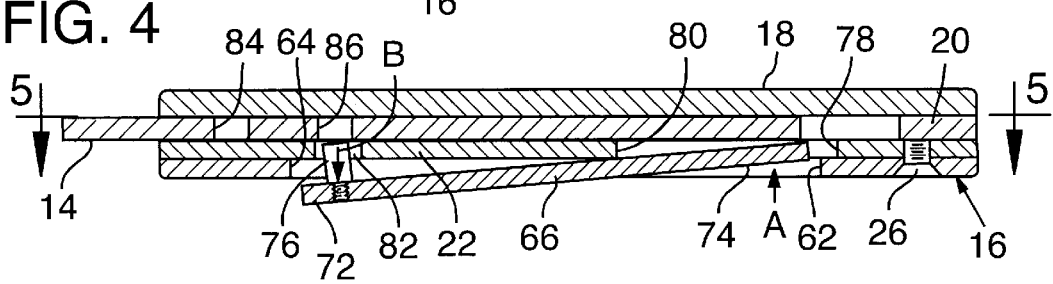
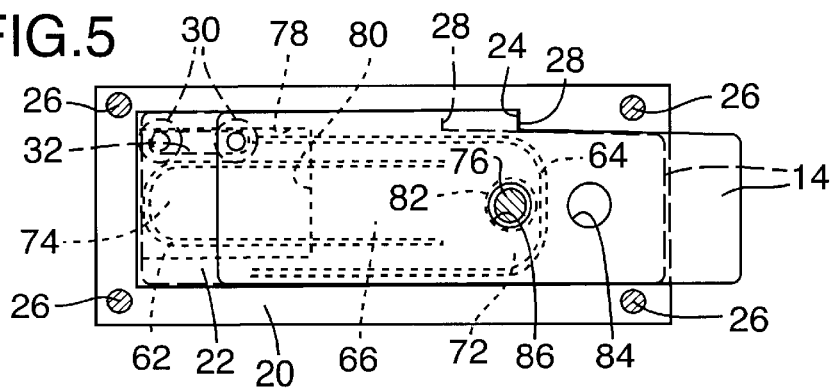

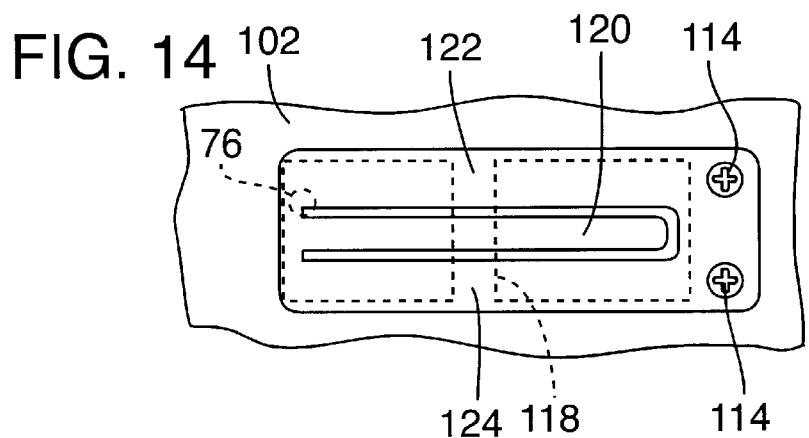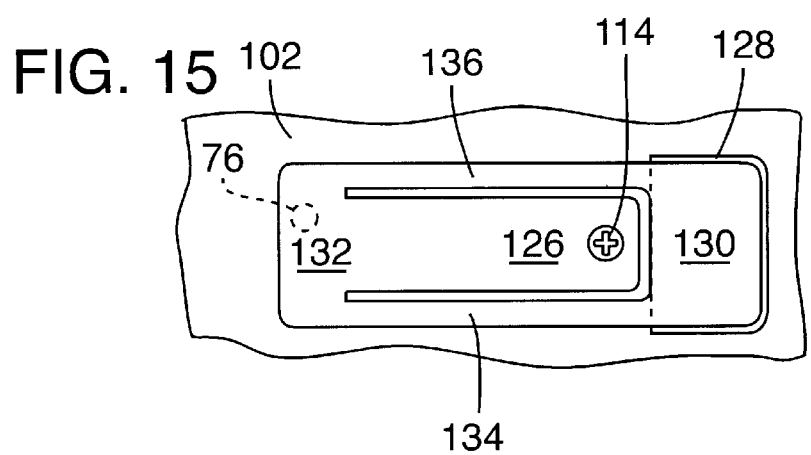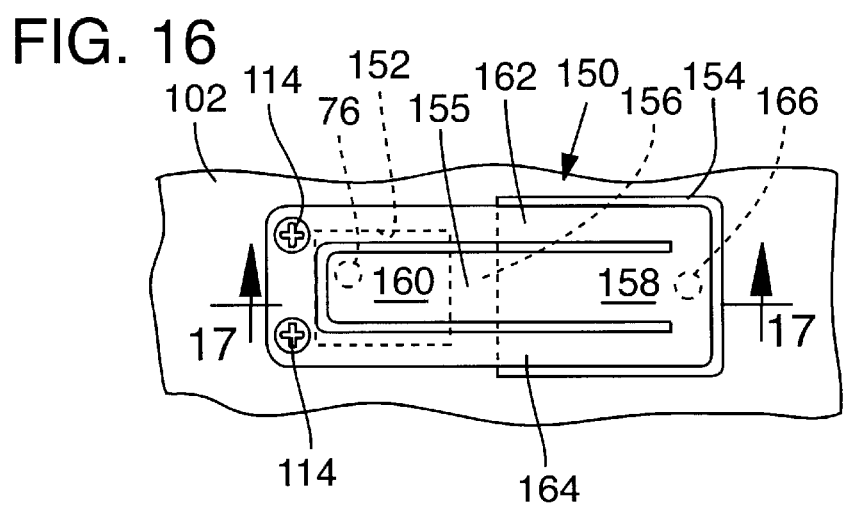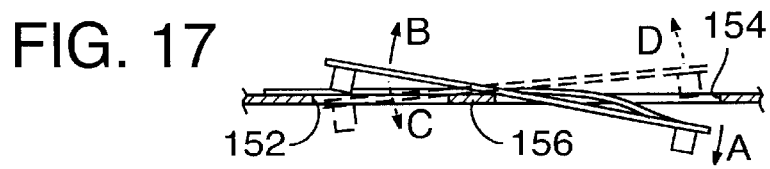

FIG. 18
FIG. 19
FIG. 20
FIG. 21
FIG. 22

ACTUATOR

FIELD OF THE INVENTION

This invention relates generally to actuating mechanisms, and more particularly, to a sturdy, easily operable and precisely controllable mechanical actuator that may be used in a multitude of situations such as the control of fluid flow, as a latch, as a switch or relay, and the like.

BACKGROUND INFORMATION

Actuating and latching mechanisms are used in innumerable situations for the mechanical advantages they provide. Generally speaking, an actuator uses a mechanical linkage to initiate some work or action—stated in another way, to actuate some action. Most latches incorporate a mechanical structure such as an actuator to selectively connect and release adjacent structures, at least one of which is movable relative to the other. Stated in simple terms, the latching mechanism connects the structures to one another to prevent relative movement, and releases the two structures to allow relative movement.

There are just about as many different actuating and latching mechanisms as there are uses for them. Indeed, there are so many different structural designs for these mechanisms that they cannot all be mentioned. But if such mechanisms can be generalized in any reasonable manner, it might be said that they include some kind of mechanical linkage—the actuator linkage—connected to one part of a structure. The actuator is movable between a normally resting position and an actuating position. In the resting position the actuator is typically not initiating or allowing any work. For instance, in the case of a latch, in the resting position the latch is selectively engaged with a cooperative part of an adjacent structure. In the actuating position, the actuator is moved out of the resting position to initiate work. Again referring to a latch, the actuator is moved out of the resting position so that the latch disengages from the adjacent structure so that the structures may move relative to one anther. The actuator is thus movable between a latching position in which the actuator engages the adjacent member and an unlatching position in which the actuator disengages from the adjacent member. In the latched position the two members are usually not movable with respect to one another. The actuator is movable to a second position in which the engagement between the actuator and the second member is disengaged, allowing relative movement of the two members. The actuator is often resiliently biased into one of either the first or second positions (generally the "latched" position), often with some kind of a spring or similar biasing mechanism.

Mechanical latches are ubiquitous and are used in a wide variety of devices. To name just a few of the many hundreds of goods in which latches of various designs are used, they are used in cameras, musical instruments, firearms, engines, cutlery and computers. In other words, a latch may be used in virtually any situation where there is a need to selectively engage and release adjacent structures.

Latches are just one example of the thousands of settings where actuating mechanisms may be used. Another example is in the control of fluid flow. Thus, valves may be classified as actuators since they selectively initiate work; they start and stop the flow of a fluid. A reed valve is a well-known type of fluid control valve that relies upon a mechanical actuator. This kind of a valve uses a valve petal that is attached to a valve casing such that the petal closes a port in the casing. The petal is typically made of a flexible metal and often uses a sealing lip between the petal and the valve casing to ensure a fluid-tight seal around the port. The valve petal is designed to open under fluid pressure moving through the port; when the pressure in the port reaches a predetermined amount, the metallic petal flexes away from the sealing engagement against the valve casing to open the valve and allow fluid flow. When the pressure in the port decreases below the predetermined value, the petal closes into the sealed position.

Reed valves are relatively easily manufactured and inexpensive, and are often beneficially used in two-stroke engines and the like. However, reed valves tend to lack the precision and accuracy that is needed in some fluid flow situations that call for better control.

Despite the many different kinds of actuating mechanisms known in the art, there is a need for still a greater variety of actuating devices that, for example, allow for accurate control of fluid flow and that allow for adjacent structures or parts to be reliably latched or locked and selectively released from the locked position.

SUMMARY OF THE INVENTION

The present invention provides an actuating mechanism for use in any situation that calls for a mechanical actuation. Notable among the many situations in which such an actuator may be used are fluid flow control, latches, electrical relays and switches. The inventive mechanism is structurally distinct from the prior art. It is mechanically elegant, strong and reliable, easily operated, versatile and aesthetically attractive.

The actuator is adaptable to virtually any situation where there is a need to initiate mechanically work, for instance to control fluid flow or to interconnect and then release two different members or structures. But the actuator may also be used in many other settings where a mechanical actuator is called for. The practical applications of the present actuator are innumerable—too many to mention.

The actuator is defined by a unitary piece of material that is either an integral part of one structural component or which is connected to one component. In one preferred embodiment, one section of the component defines a panel having a pair of opposed and overlapping, generally U-shaped slots formed therein. The panel is formed of a resilient material and the slots are overlapping such that in combination they define a pivoting lever arm mechanism that is integrally connected with opposite spring arms. When a central section of the panel—that is, the lever arm—is pushed in one direction, the opposite, free end of the lever arm moves in the opposite direction. This causes the lever arm to move in a rocking motion—one end of the lever arm moves in one direction while the other end moves in the other direction. This teeter-toter movement may be used to initiate work—that is, to actuate. For example, in the resting position one end of the lever arm may be in a sealing position relative to an adjacent port for containing a fluid. When fluid pressure in the port exceeds a predetermine value, the lever arm moves out of the resting or closed position to open the valve and cause fluid flow through the port. The teeter-toter movement may if desired be used to initiate other work. Thus, since both ends of the lever arm are moving when the actuator is moving, both ends may be used to initiate some secondary work with appropriate linkage.

As another illustration, take the case where a locking pin or some equivalent structure is carried on the lever arm extending toward an adjacent structure such that the locking pin engages the adjacent structure. Since the panel is resilient, the locking pin is normally biased toward the second structure. When the two adjacent structures (that is, the structure that carries the actuator and the adjacent structure that the actuator engages) are in the closed position the locking pin engages a cooperatively formed part and thus latches the two structures to prevent movement relative to one another, locking the two in a first or "locked" position. The two structures are unlocked from one another to allow relative movement by actuating the lever arm by pushing one end of the actuator in one direction to pivot or rock the free end of the lever arm and thus move the locking pin out of engagement with the cooperatively formed part of the adjacent structure. The engagement between the locking pin and the adjacent structure is thus released, allowing for relative movement between the two.

Similarly, the invention may be embodied in a system in which an actuator is needed without regard to adjacent, movable structures. The resilient actuator of the present invention may thus be utilized in any situations where a spring-biased actuator is needed.

The lever arm actuating and actuating mechanism may be formed in a variety of different configurations, and the mechanism may optionally be used in combination with a fulcrum positioned between the body that carries the lever arm and the adjacent structure.

BRIEF DESCRIPTION OF THE DRAWINGS

The invention will be better understood and its numerous objects and advantages will be apparent by reference to the following detailed description of the invention when taken in conjunction with the following drawings. It will be understood that the present invention is not limited to use with any particular type of device and is instead useful in any situation where an actuated latch or actuating mechanism is called for. Nonetheless, in order to fully describe the invention and to illustrate its advantages and features, the invention will be described with reference to specific structures in which the basic structural features of the invention are utilized.

FIG. 1 is a perspective view of a device embodying the present invention, in which a member is slidably carried in a body carrying the actuator.

FIG. 2 is a perspective view of the device shown in FIG. 1, with the sliding member shown in the closed position in which the member is received in a slot define between body halves.

FIG. 4 is a top, partial cross sectional view taken adding the line 4—4 of FIG. 1.

FIG. 5 is a side elevational vise of the device shown in FIG. 4, taken along the line 5—5 of FIG. 4, and with one of the body halves removed to expose the sliding member, which is in the extended position in solid lines and in the retracted position shown in phantom lines.

FIG. 14 is a plan view of another alternate embodiment in which the widths of the spring arms in the actuating mechanism are varied to vary the biasing resistance of the mechanism.

FIG. 15 is a plan view of yet another alternate embodiment of an actuating mechanism according to the present invention.

FIG. 16 is a plan view of still another alternate embodiment of the actuating mechanism according to the present invention.

FIG. 17 is a partial fragmentary cross sectional view taken along the line 17—17 of FIG. 16.

FIG. 18 is still another plan view of another alternate embodiment of the actuator of the present invention.

FIG. 19 is a partial fragmentary cross sectional view taken along the line 19—19 of FIG. 18.

FIG. 20 is a perspective view of another alternate embodiment of an actuator according to the present invention, in which the actuator defines a clip device.

FIG. 21 is a plan view of the embodiment shown in FIG. 20, mounted on a surface.

FIG. 22 is a side elevational view of the mechanism shown in FIG. 20.

DETAILED DESCRIPTION OF THE PREFERRED EMBODIMENTS

Figure 3:
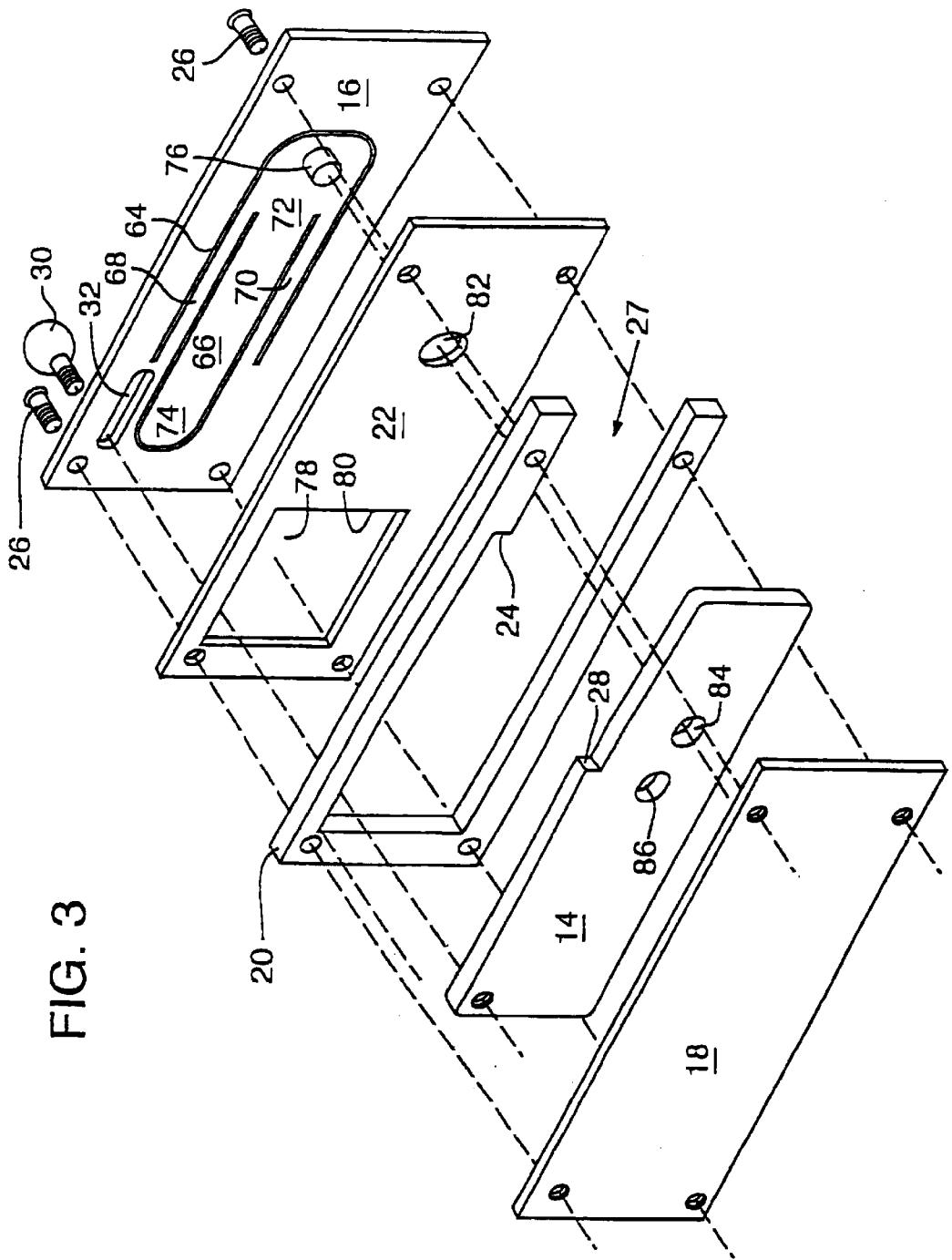
FIG. 3 is a perspective exploded view of the device in FIG. 1.

Referring now to the drawings, and more particularly to FIG. 1, the actuating mechanism is shown in one of many embodiments in which the mechanism may be used. It will be appreciated that the invention as described herein is applicable to a multitude of different uses and that the invention is not limited to use of the inventive mechanism in any particular structure. Nonetheless, in order to fully describe the actuator and the manner in which it operates, it is disclosed with reference to the specific embodiments shown in the drawings.

In FIG. 1 actuator 10 is shown embodied in body 12 that includes a sliding member 14 contained in a slot defined between body halves. The-actuator 10 allows for selective engagement and disengagement of sliding member 14 to allow for movement of the sliding member relative to the body. Sliding member 14 is movable between the extended position shown in FIG. 1, where the member is moveable with respect to body 12, and the closed position shown in FIG. 2, where the sliding member is received within body 12.

With reference to FIGS. 1 and 2, body 12 comprises several components, including a pair of oppositely located side wall sections, generally indicated at right side wall 16 and left side wall 18. The side walls are oriented generally parallel with each other, and a spine 20 is located between the side wall section. Spine 20 separates the side wall sections in spaced apart relationship and thus defines a groove or slot between the side wall sections for receiving sliding member 14. As best shown in FIG. 3, an inner plate 22 is disposed inwardly alongside side wall 16 and between side wall 16 and spine 20.

When body 12 is assembled, spine 20 is disposed between the inner plate 22 and side wall 16, and side wall 18, respectively, and extends along the upper and lower edge margins of the side wall sections, as illustrated in FIG. 3. Suitable fasteners such as screws 26 are used to hold together the side walls 16, 18 and spine 20 and inner plate 22. As described below, side wall 16, which carries the actuating mechanism, is fabricated from a resilient material such as spring steel. However, other suitable materials such as titanium, various plastics, etc., may be used. Likewise, side wall 18 and inner plate 22 may be fabricated from a like variety of materials, including reinforced hard synthetic plastics such as Micarta™.

The side wall sections 16, 18 and the spine section 20 define a slot 27 (see FIG. 3) for receiving member 14 when it is moved to its closed position. Member 14 is illustrated arbitrarily as a sliding member—this is simply to illustrate the invention that is embodied in the actuator. It will be appreciated that the invention applies to the actuator 10, regardless of whether it used with any particular other structures. To facilitate sliding movement of member 14 in body 12, spine 20 defines a centrally open slot 27 that includes an inwardly facing shoulder 24. When assembled, shoulder 24 engages a cooperatively formed outwardly facing shoulder 28 on member 14. When member 14 slides in body 12 it is free to move longitudinally in slot 27 until the shoulders abut against one another. This prevents member 14 from being removed from body 12.

Referring to FIGS. 1 through 3, a lug 30 extends through an elongate slot 32 formed in side wall 16 and is attached to member 14 (for example with threads, as shown in FIG. 3). Lug 30 is for illustrative purposes only and is included to show how member 14 may be moved between the extended position shown in FIG. 1 when the actuator 10 releases the engagement with member 14 and back to the retracted position shown in FIG. 2.

Actuating Mechanism

A first preferred embodiment of the actuating mechanism is shown in FIGS. 1 through 5, and is designated generally with reference number 60. Actuating mechanism 60 comprises an elegantly simple mechanical device that is remarkably versatile with respect to its ability to latch and unlatch, release and secure objects relative to one another, or simply to open and close an opening. It is described herein in terms of a preferred embodiment as it relates to a member 14 that slides within a body 12. Those skilled in the art will readily appreciate the versatility of the design. Moreover, an actuating mechanism that utilizes the same or equivalent mechanical and structural principles as the preferred embodiments described herein may be built in any number of configurations. Some of those alternatives are described herein. However, those skilled in the art will recognize that other design variations may be made that are equivalent to the mechanisms described below and shown in the Figures.

With reference to FIG. 1 and as described in detail below, actuating mechanism 60 is characterized by a lever arm that is integrally connected with spring arms. The mechanism is preferably fabricated from a unitary piece of material and as such, the lever arm and the spring arms are defined by the material from which the mechanism is constructed and are thus integrally connected to the spring arms. Although in one preferred embodiment the actuating mechanism is formed from a unitary piece of material, the actuating mechanism may be constructed from multiple pieces connected to one another. The word unitary will thus be understood to refer to a mechanism that is either fabricated from a monolithic piece of material, or from multiple pieces that are connected in an appropriate manner to allow the interconnected pieces to perform as a monolithic piece. In a normal, relaxed or neutral position, the spring-powered actuating mechanism is in the locked position, shown in FIG. 1. The material from which the actuating mechanism is fabricated has a "memory," such that the material returns to the neutral position when no outside forces are acting on the mechanism. One end of the lever arm carries a locking pin or similar device for engaging the adjacent member that is, when the mechanism is locked, immovable relative to the body member that carries the actuator. The end of the lever arm that carries the locking pin is pivoted away from the body in response to pressure exerted on the opposite end of the lever arm. Stated in another way, as one end of the lever arm is pushed in one direction, the opposite end of the lever arm moves in the opposite direction. This mechanical linkage is used to provide a mechanical advantage, for instance, to lock and unlock the member relative to the actuator.

In the embodiment of FIGS. 1 through 5, a fulcrum is located inwardly of the lever arm to assist the free end of the lever arm to lift or rock a locking pin away from the resting or locked position.

Actuating mechanism 60 is defined in FIGS. 1 through 5 by a pair of generally U-shaped overlapping slots formed in side wall 16. As noted, side wall 16 is fabricated from a resilient material such as spring steel, although many different resilient materials, including plastic, may be used. Side wall 16 is preferably a unitary piece of steel cut into the desired shape. A pair of generally U-shaped slots is cut completely through the side wall. The first slot, or inner slot 62, is oriented on side wall 16 such that the "open" portion of the U faces toward the "front" end of the body—that is, the end of the body through which member 14 extends. The second, or outer slot 64 overlaps inner slot 62 with the open portion of the slot oriented in the opposite direction, toward the rear of the body. This combination of the opposed and overlapping U-shaped slots defines a central lever arm 66 and two opposed spring arms 68, 70, on one each side of the central lever arm where the opposed slots overlap. The two spring arms are formed from the same, monolithic section of side wall 16, and the spring arms are thus integrally connected to the central lever arm. The forwardmost end of the combined overlapping slots, that is, the portion of side wall 16 toward the front end of the body and bounded by the U of outer slot 64 is labeled with reference number 72, and defines a lifting portion 72. Lifting portion 72 defines the free end of the actuating mechanism since it may be lifted away from the resting position shown in FIG. 1. The rearwardmost end of the combined slots, that is, the portion of central lever arm 66 that is bounded by the U of inner slot 62 is labeled with reference number 74, and defines an actuating portion 74. A locking pin 76 is carried on lifting portion 72 and extends inwardly in body 12 toward member 14. Locking pin may be a separate piece that is connected to the lifting portion, as shown, or may be of any number of configurations such as a bent-over tab.

Figure 7:
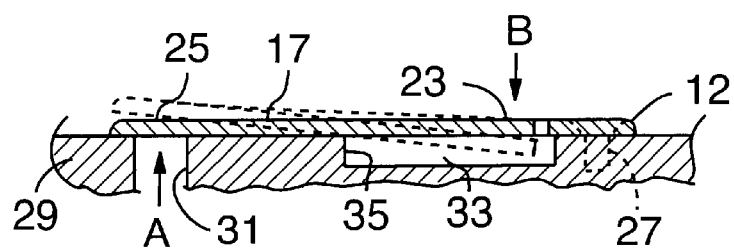
FIG. 7 is a side elevational view of the actuator shown in FIG. 6 taken along, the line 7—7 of FIG. 6.

With reference to FIG. 3 it will be seen that inner plate 22 has an opening 78. Opening 78 is shaped cooperatively with actuating portion 74 of central lever arm 66, and as may be seen in FIG. 7, opening 78 is sized larger than actuating portion 74 such that the actuating portion fits into the opening when the actuating portion is moved inwardly—that is, when actuated. When side wall 16 is assembled with inner plate 22 the actuating portion 74 of central lever arm 66 aligns with opening 78 (FIG. 7). The forward most edge of opening 78 is given reference number 80. When side wall 16 and inner plate 22 are assembled, edge 80 is positioned such that it lies adjacent to and inwardly of central lever arm 66 approximately midway along the length of the central lever arm.

With reference to FIG. 4 the operation of actuating mechanism 60 will be apparent. Pressure applied against actuating portion 74 of central lever arm 66 in the direction of arrow A drives the actuating portion inwardly toward the center of body 12, that is, toward slot 27. Simultaneously, the free end of the lever arm, that is, lifting portion 72 moves in the opposite direction, that is, the direction of arrow B in FIG. 4. Forward most edge 80 of inner plate 22 acts as a fulcrum upon which central lever arm 66 pivots. As actuating portion 74 moves inwardly in the direction of arrow A, the actuating portion is pushed into opening 78 in inner plate 22. The width of inner plate 22 thus provides for a greater distance through which actuating portion 74 may move, and a correspondingly greater distance that lifting portion 72 travels. The corresponding distance that lifting portion 72 moves in the direction of arrow B is determined in this instance by the position of the fulcrum defined by edge 80, and by the distance that the actuating portion may be pushed toward slot 27. Stated otherwise, with edge 80 positioned as shown in FIG. 4—approximately midway along the length of central lever arm 66, movement of actuating portion 74 over a distance of X in direction A, corresponds to movement of lifting portion 72 in direction B of about X. If opening 78 is enlarged such that edge 80 is shifted forward (i.e., toward locking pin 76), movement of actuating portion 74 over a distance of X in direction A, will result in a corresponding movement of lifting portion 72 in direction. B that is somewhat less than X. It will also be appreciated in this instance that the amount of force necessary to drive the actuating portion inwardly will be relatively less than in the case illustrated in FIG. 4. On the other hand, if opening 78 is reduced in size such that edge 80 is shifted rearward (i.e., away from locking pin 76), movement of actuating portion 74 over a distance of X in direction A, will result in a corresponding movement of lifting portion 72 in direction B that is somewhat greater than X. It will be appreciated in this later instance that the amount of force necessary to drive the actuating portion inwardly will be relatively greater.

The "throw" of lifting portion 72—that is, the distance that lifting portion 72 travels, is thus adjustable by the position of edge 80 relative to the central lever arm. It will be appreciated that by changing the thickness of inner plate 22, the throw of the lifting portion may similarly be changed.

As noted, side wall 16 is fabricated from a resilient material such as spring steel. In the embodiment shown in FIGS. 1 through 5, the normal resting position of actuating mechanism 60 is such that the central lever arm 66 is flush against the outer side of the body (FIGS. 1, 3 and 3). Because side wall 16 is resilient, pressure applied against actuating portion 74 in direction A (FIG. 4) is resisted by the biasing resilience of opposed spring arms 68 and 70, which as noted are integrally attached to the lever arm. The amount of this biasing resistance—the spring force, may be adjusted by the relative widths of these opposed lever arms and also by the thickness of the material used to fabricate the side wall itself. The force needed to actuate the actuating mechanism 60 may be varied by changing these factors. Moreover, while it is preferable to build actuating mechanism 60 from a unitary blank of material, an equivalent actuating mechanism may be made from several pieces connected together.

Turning now to the specifics of operation of actuating mechanism 60 with member 14, it will be seen in FIG. 3 that a hole 82 is formed in inner plate 22 and a cooperatively formed hole 84 is formed in member 14. When the body is assembled, holes 82 and 84 align and locking pin 76 extends through each of said holes into an engaging relationship with member 13. A second hole 86 is formed in member 14 rearwardly of hole 84. When member 14 is in the retracted position, locking pin 76 extends into hole 82 and as noted, locks member relative to body 12. The resilient biasing action of actuating mechanism 60 maintains this locking position and member is thus locked securely in the retracted position. Member 14 remains in the retracted position until the actuating mechanism is actuated to unlock the member relative to the body. This is accomplished by pressure being applied in the direction of arrow A (FIG. 4) until locking pin 76 is moved in the direction of arrow B a sufficient distance that the pin clears or disengages from hole 82. At this point member 14 may be freely slid in slot 27 into the second, or extended position shown in solid lines in FIG. 7. Member 14 may be slid toward the extended position until shoulders 24 and 28 abut one another to prevent further movement of member 14 relative to body 12. When shoulders 24 and 28 abut, locking pin 76 aligns with hole 86 in member 14. When the locking pin is aligned with the hole, the biasing force of the actuating mechanism pushes the locking pin into the opening, thereby locking member 14 in the extended position.

Member 14 is moved from the extended position to the retracted position by again actuating the actuating mechanism (as described above) until locking pin 76 clears or disengages from opening 86. The member may then be freely slid inwardly into slot 27 (with lug 44) until in the retracted position shown in phantom lines in of FIG. 7. At this point the locking pin engages hole 84 in member 14 and the member is locked in the retracted position relative to body 12. Although the particular locking pin 76 shown in the figures is circular in cross section, the pin could be of virtually any design that engages a cooperatively formed portion of member 14.

As noted previously, the actuating mechanism of the present invention is not limited to a structural combination such as that shown in FIGS. 1–5. Rather, the embodiment shown in these figures is to illustrate the fundamental structure of the actuator 60. There are numerous alternate embodiments that are equivalent to the preferred embodiment of actuator 60 described above. For example, inner plate 22 is optional and is used to provide a fulcrum and to provide a throw distance that increases the travel of, for instance, the locking pin. In this case the actuating portion 74 of central lever arm 66 may be bent outwardly away from side wall 16 such that actuating portion is not flush with the side wall. This structure allows for either elimination of opening 78 in the inner plate or elimination of the inner plate altogether, yet the locking pin may be moved through a sufficient distance to allow for locking and unlocking as described above. Thus, if actuating portion 74 of central lever arm 66 is bent outwardly, then the lever arm acts as the fulcrum where it abuts a surface inwardly of the lever arm. The surface itself thus acts as a fulcrum where it abuts the inner-facing surface of the actuator arm. Moreover, with an actuating portion that is bent outwardly, the actuating mechanism has enough force even without an underlying surface to raise the free end of the lever arm out of the resting locked position. That is, even without an underlying surface, pushing the actuating portion inwardly will cause the lifting portion 72 to move in the opposite direction to effect unlocking of the actuator mechanism.

Those skilled in the art will readily appreciate that the position and orientation of the actuating mechanism relative to both the body and the adjacent structure that the actuator engages (such as member 14) may be varied widely. For example, the particular structures used to lock the member in the extended and retracted positions may be varied widely with the same basic actuating mechanism. Similarly, the mechanism may be oriented within the body in a variety of ways. As one example, the longitudinal axis defined by the central lever arm may be oriented transverse to the longitudinal axis of the body or in any other orientation. Moreover, the lifting portion of the central lever arm may itself be used to engage the adjacent movable member. In this configuration, the free end of the lever arm normally extends inwardly toward the member that is to be engaged, such that it is in an engaging relationship with a cooperatively formed edge on the member. Actuating the actuating portion of the lever arm lifts the lifting portion out of the engaging relationship to unlock to member. Further, the member-engaging pin (as with locking pin 76) may engage the adjacent member 14 in any convenient position other than a hole in the blade.

Figure 6:
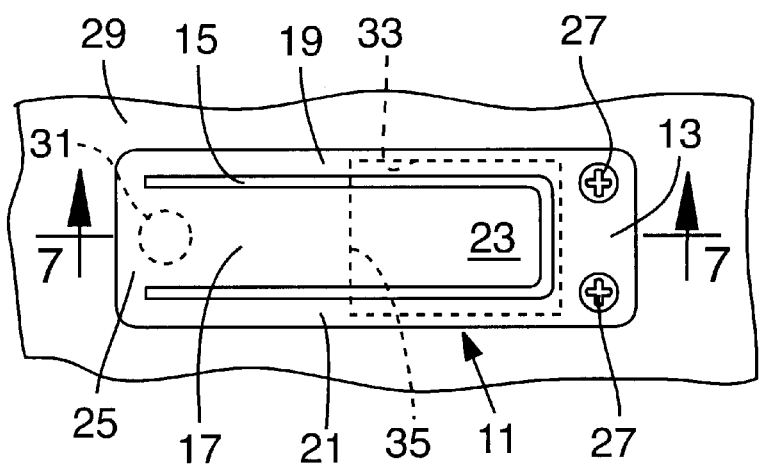
FIG. 6 is a plan view of an actuator according to the present invention that is used to control fluid flow through a port.

The actuator according to the present invention constructed with the basic mechanical features just described may be used to control the flow of fluid (e.g., liquid, vapor, gas) through a port. Referring now to FIGS. 6 and 7 it may be seen that actuator 11 comprises a structure similar to that already described. Specifically, actuator 11 is formed of a monolithic plate 13 of a flexible resilient material such as spring steel or other materials such as phenolic resins, glass reinforced epoxy and the like. In the embodiment of FIGS. 6 and 7, a single U shaped slot 15 is cut through plate 13 to define a central lever arm 17 and two opposed spring arms 19 and 21 that are integrally connected to the central lever arm. The end of lever arm 17 that is at the closed end of U shaped slot 15 defines the actuating portion 23, and the lifting portion 25 of central lever arm 17 is at the opposite, free end. Screws 27 affix the end of plate 13 adjacent the actuating portion 23 to an adjacent, underlying valve case 29. Valve case 29 includes a fluid port 31 that underlies lifting portion 25 of actuator 11.

When in the normally resting or closed position shown in FIG. 6 the lifting end 25 of actuator 11 is in a fluidly-sealed engagement with fluid port 31. Stated otherwise, when in the resting position the valve is closed and the lifting end of the actuator engages the valve case. Gaskets made of materials appropriate to the specific environmental conditions may be added to lifting end 25 to facilitate the fluid-tight seal. Valve case 29 has an opening 33 located immediately below the actuating portion 23 of central lever arm 17. One edge 35 of opening 33 acts as a fulcrum for central lever arm 17. Plate 13 is attached to valve case 29 such that the actuating portion 23 of lever arm 17 is movable downward into opening 33 when actuated.

Actuator 11 may be actuated in several ways to control the flow of fluid through port 31. For instance, the actuator may be "calibrated" such that when the pressure of fluid within port 31 reaches or exceeds a predetermined value, the internal pressure in the port forces lifting end 25 out of the sealed position (in the direction of arrow A in FIG. 7). This opens the valve and fluid flows through port 31. Fluid pressure in port 31 may be supplied by any means appropriate to the application in which the actuator is being used. The distance that lifting end 25 moves out of the sealed position is determined by a combination of elements, including the depth of opening 33 and the position of edge 35 along the length of lever arm 17. When the fluid pressure in port 31 decreases to below the predetermined value, the biasing force of spring arms 19 and 21 forces lifting end 25 back into the resting, closed and sealed position. The amount of pressure required to open the valve may be "calibrated" by in any of several ways, for example, the thickness of the spring arms, the materials used to fabricate the actuator, the position of the fulcrum, and other equivalent means. Alternately, fluid flow through port 31 may be initiated with mechanical force exerted on actuating end 23 of lever arm 17, as with, for example, a push rod moving in the direction of arrow B in FIG. 7.

The teeter-toter, rocking motion of actuator 11 can be used to selectively initiate and stop the flow of fluid through port 31 by the movement of actuating portion 25. But as lifting portion 25 moves, the opposite end of lever arm 17 (actuating end 23) also moves in the opposite direction. This movement of the actuating end may be beneficially used to accomplish some other work. For instance, the actuating end may be mechanically linked to other structures to likewise initiate work. Alternately, the actuating portion 23 may itself be used to open and close a fluid port, either in concert with the opening and closing of port 31 or in opposition thereto.

There are numerous other structural configurations that may be used for actuating mechanisms that rely upon the same or equivalent lever arm mechanisms as described above. A sampling of alternate embodiments of the actuating mechanism is illustrated in FIGS. 8 through 17. Beginning with FIGS. 6 and 7, the actuating mechanism 100 is a separate piece from the body side wall that is shown attached at one end thereof to a body side wall 102 with suitable fasteners such as screws 114. The mechanism thus comprises a monolithic plate 104 of resilient material such as spring steel that includes a single U shaped slot 106 cut therethrough that defines a central lever arm 108 and two opposed spring arms 107 and 109 that are integrally connected to the central lever arm. The end of lever arm 108 that is at the closed end of U shaped slot 106 defines the actuating portion 110, and the lifting portion 112 of plate 104 is at the opposite, free end of plate 104. Screws 114 affix the end of plate 104 adjacent the actuating portion 110 to the side wall 102. This leaves the opposite end of plate 104 as a free end that May be lifted away from the resting, locked position into the unlocking position by actuation of the actuating mechanism. A locking pin 76 is carried on the lifting portion 112 and extends inwardly to lock the adjacent member as described above. Side wall 102 has an opening 116, one edge of which acts as a fulcrum 118. Plate 104 is attached to side wall 102 such that the actuating portion 110 of lever arm 108 is position such that the lever arm may be moved into opening 116 when actuated.

Figure 9:
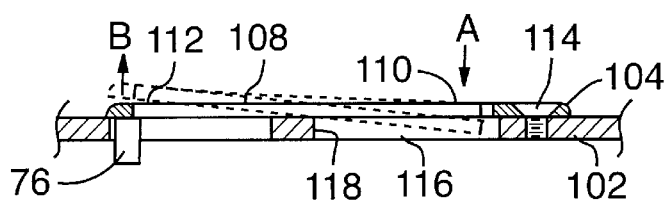
FIG. 9 is a partial fragmentary cross sectional view taken along the line 9—9 of FIG. 8.

It will be understood that as shown in FIG. 9, when actuating portion 110 is moved in the direction of arrow A, the lifting portion 112 of plate 104 moves in the opposite direction, represented by arrow B. Locking pin 76 or an equivalent engaging structure extends through the side wall into an engaging relationship with the member that is to be locked relative to the actuator when the actuating mechanism is in the resting position.

Figure 8:
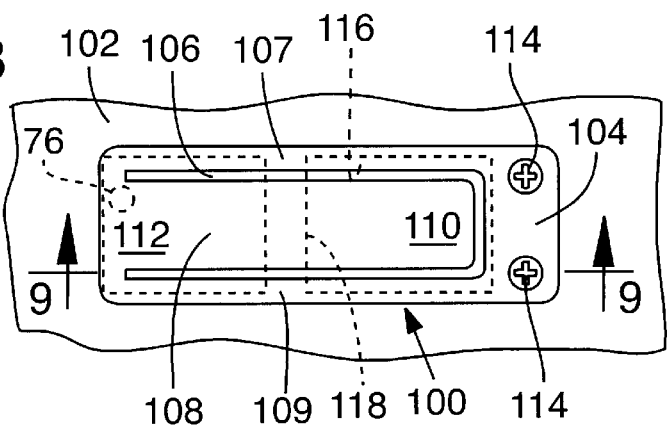
FIG. 8 is a plan view of an alternative embodiment of an actuating mechanism according to the present invention.
Figure 10:
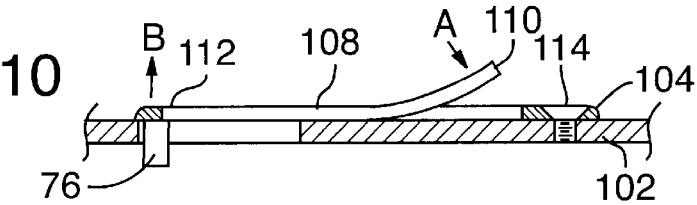
FIG. 10 is a partial fragmentary cross sectional view of another alternative embodiment of an actuating mechanism according to the present invention.

FIG. 10 illustrates an alternate embodiment similar to the design shown in FIGS. 8 and 9, but which eliminates the opening 116 in side wall 102. In the embodiment of FIG. 10, the actuating portion 110 is bent outwardly, away from the surface of side wall 102. When actuating portion 110 is pushed in the direction of arrow A, lifting portion 112 is moved in the direction of arrow B to lift locking pin 76 out of the locking position. The side wall 102 acts as a fulcrum for lever arm 108 in the embodiment shown in FIG. 10.

Figure 11:
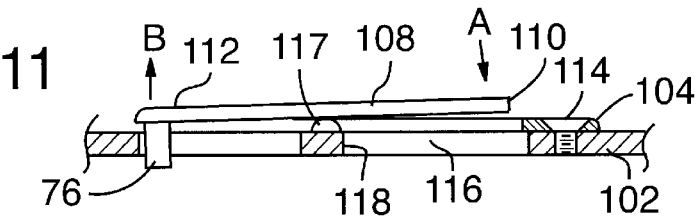
FIG. 11 is a partial fragmentary cross sectional view of yet another alternative embodiment of an actuating mechanism according to the present invention.

FIG. 11 is an embodiment similar to FIG. 10 in a fulcrum 117 has been added to side wall 102 under lever arm 108. It will be appreciated that the amount of force required to raise lifting portion 112 and the distance that locking pin 76 travels may be varied by changing the position of the fulcrum relative to the lever arm. The amount of force necessary to lift the lifting portion may also be changed by changing the material used to make plate 104, the thickness of the plate, and the thickness of the opposed spring arms.

Figure 12:
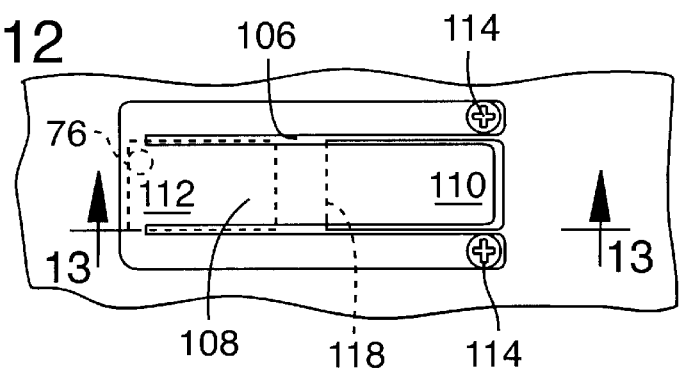
FIG. 12 is a plan view of still another alternative embodiment of an actuating mechanism according to the present invention.
Figure 13:
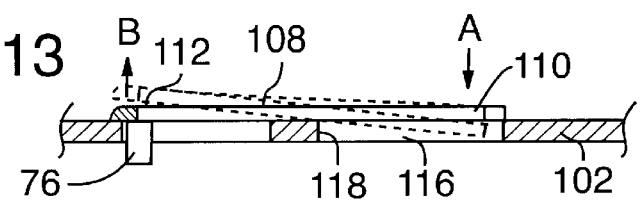
FIG. 13 is a partial fragmentary cross sectional view taken along the line 13—13 of FIG. 12.

FIGS. 12 and 13 illustrate yet another embodiment of an actuating mechanism that incorporate the unitary lever arm and spring arms according to the concepts of the present invention. The embodiment shown in FIGS. 12 and 13 are similar to the embodiment shown in FIGS. 8 and 9.

Varying the characteristics of the materials within the mechanism may change the operational and functional characteristics of the actuating mechanism. For example, the force necessary to raise the lifting portion out of the resting position can be changed by changing the relative thickness and/or flex strength or characteristics of the central lever arm relative to the opposed spring arms. As one example of this feature, if the mechanism is fabricated from spring steel, the steel could have differential tempering between the central lever arm and the spring arms. This would relatively change the biasing strengths of these structural components.

FIG. 14 illustrates an alternate embodiment that illustrates the principles just described. In FIG. 14 the central lever arm 120 is relatively narrower than the two adjacent outer spring arms 122 and 124. In this case the thickness of central lever arm 120 could be made greater than the thickness of the spring arms 122 and 124. Alternately, the flexing characteristics of lever arm 120 could be modified with differential tempering as described. Without these modifications, then the embodiment of FIG. 14 likely would simply be distorted by force applied to the actuating portion. However, by varying the relative widths of the spring arms or by changing the relative flexing characteristics, the biasing resistance—that is, the amount of force needed to move the actuating portion inwardly to effect actuation of the actuating mechanism, may be varied. In the example of FIG. 14, the amount of resistance—the spring force—typically would be greater than the actuating mechanism illustrated in FIG. 8.

In FIG. 15 the central lever arm 126 is fixed to the underlying surface of body side wall 102 with a screw 114. Side wall 102 has an opening 128 positioned such that end portion 130 of the actuating mechanism may move inwardly into opening 128. In this instance the end portion 130 becomes the actuation portion of the mechanism. When end portion 130 is pushed inwardly toward the side wall, the lifting portion 132, which is at the opposite end of the mechanism, moves outwardly to disengage pin 76 from the blade. Spring arms 134 and 136 provide biasing resistance.

A double acting mechanism is illustrated in FIG. 16 as just one of the many different embodiments of the present invention. In FIG. 16 actuating mechanism 150 is shown as a separate unitary piece attached to side wall 102 with a pair of screws 114. A pair of openings 152 and 154, respectively, is formed in side wall 102 in positions under the opposite ends of the actuating mechanisms. A fulcrum member 156 is defined between openings 152 and 154. With this configuration, each end of the central lever arm 155 may be used as the actuating portion. Thus, if central lever arm 155 is pushed at actuating portion 158 in the direction of arrow A in FIG. 17, lifting portion 160 moves out of the locking position as the central lever arm rocks on fulcrum 156. This disengages locking pin 76 from the blade as described above. The outer spring arms 162 and 164 provide biasing resistance to this movement. It will be appreciated that the end of central lever arm 155 labeled with reference number 160 may be pushed inwardly into the underlying opening 152, in the direction of arrow C in FIG. 17. This results in the end of central lever arm labeled 158 to move in the opposite direction—that is, in the direction of arrow D in FIG. 17, causing locking pin 166 to disengage from the blade. Again, the outer spring arms 162 and 164 resist this movement and will return the mechanism to the normal, locked position when pressure on the central lever arm is released.

Figures 18, 19, 20, 21, 22:
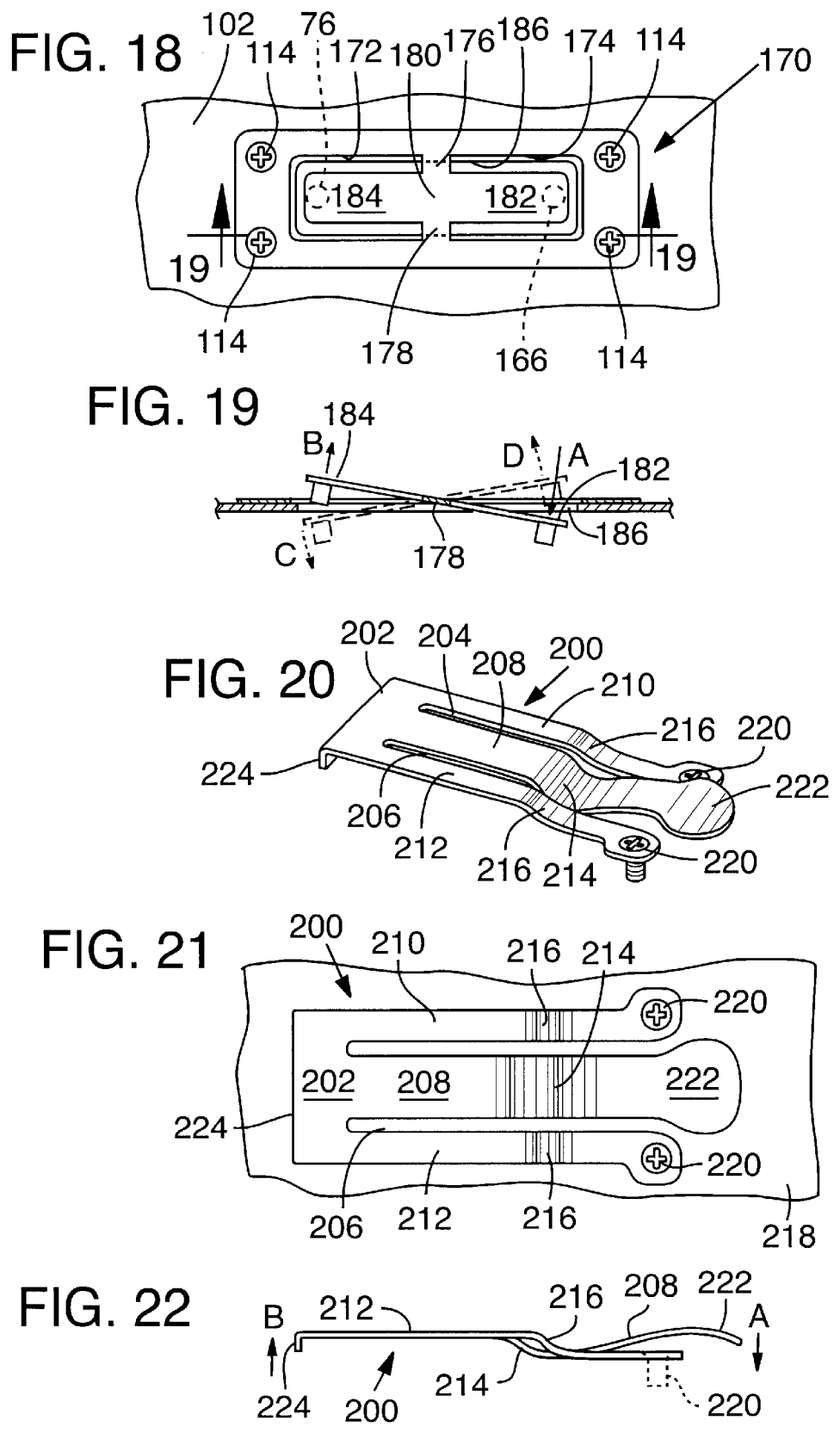

Finally, another embodiment of the invention is shown in FIGS. 18 and 19 in which the spring arms define a torsion-type or twisted beam type of spring mechanism. With reference to FIG. 18, actuating mechanism 170 is defined by a pair of facing U-shaped cutouts 172 and 174 that are spaced apart and define between the ends of the cutouts opposed spring arms 176 and 178. The U-shaped cutouts define a central lever arm 180 having opposite ends labeled 182 and 184, respectively. An opening 186 is formed in side wall 102 below central lever arm 180 and locking pins 76 and 166 are carried on opposite ends of the lever arm.

With reference to FIG. 19, it will be appreciated that pressure applied at end 182 of central lever arm 180 in the direction of arrow A will cause end. 184 to move in the opposite direction (arrow B). Likewise, movement of end 184 in the opposite direction (i.e. the direction of arrow C) causes end 182 to move away from side wall 102 (arrow D). In either case, opposed spring arms 176 and 178 act as torsion springs or twisted beam type of springs to urge the actuating mechanism back into the normally locked position when pressure exerted on the central lever arm is released. Those of skill in the art will appreciate that the resiliency characteristics of the mechanism may be varied widely according to such factors as the cross sectional configuration of the spring arms, their size, and the materials used to fabricate the mechanism.

The torsion actuating mechanism illustrated in FIGS. 18 and 19 may be modified such that it is "inverted." This is done by fixing the opposite ends of the central lever arm at ends 182 and 184 to the side wall, for example, with screws. In this example the outer portions of the actuating mechanism—that is, the portions outward of the U-shaped cutouts, would move into and out of the locking position.

As noted above, the actuator described herein is not limited to any particular structure or kind of latching situation or other structure. The actuator may be used in most any setting where there is a need to, for example, engage one structure selectively relative to another. The actuator may be used in cameras, musical instruments, firearms, engines, cutlery and computers. As noted, the mechanism may be used as a valve to accurately control the flow of fluids. Similarly, the mechanism may be used in electrical switches and relays to open and close circuits and the like. These few examples are included by way of illustration only and are not intended to limit either the scope of the invention or the applications in which it may be used.

As yet another example, the actuator mechanism according to the present invention may be utilized to form a clip that is useful in many different settings. With reference to FIGS. 20–22, actuator 200 comprises a monolithic member 202 that has a pair of slots 204 and 206 cut therethrough. Slots 204 and 206 extend only part of the length of member 202 and thus define a central lever arm 208 and opposed spring arms 210, 212. As best viewed in FIGS. 20 and 22, the central lever arm 208 is bent downwardly at a region 214. Spring arms 210 and 212 are similarly bent downwardly at 216, which is laterally displaced relative to region 214. The outer ends of spring arms 210 and 212 are fastened to an underlying structure 218 (FIG. 21) as with screws 220. The end of central lever arm 208 outward of region 214 is bent gradually back upwardly and terminates at an end portion 222. In side elevation the bent portions of central lever arm 208 define a serpentine section, as seen in FIGS. 20 and 22. The end of member 202 opposite end portion 222 is bent downwardly to form a tab 224.

It will be appreciated that when actuator 200 is fastened to an underlying structure 218 as in FIG. 21, the portion of central lever arm 208 near region 214 rests against the surface of 218 and tab 224 similarly rests on the surface of 218. The portion of central lever arm 208 that abuts structure 218 acts as a fulcrum. The biasing resistance provided by spring arms 210 and 212 force tab 224 against the surface of structure 218 and maintain this orientation until force is applied against end portion 222 in the direction indicated by arrow A on FIG. 22. Under the pressure of such force, tab 224 moves in the direction indicated by arrow B, and spring arms 210 and 212 provide biasing resistance to this movement. As a result, actuator 200 functions as a clip that may be used to attach one member to another, for instance, a clip for securing a knife in a sheath, and similar uses.

With each of the foregoing embodiments it will be appreciated that as the lifting end of the inventive actuator is moved from its resting position into the actuating position, the opposite end of the central lever arm also moves. The actuating end of the lever arm may thus connect through appropriate linkage to accomplish work on other structures.

In view of the many possible embodiments to which the principles of our invention may be applied, it should be recognized that the detailed embodiments are illustrative only and should not be taken as limiting the scope of my invention.

Rather, we claim as our invention all such embodiments as may come within the scope and spirit of the following claims and equivalents thereto:

1. An actuator comprising:
    a first body having a lever arm formed therein, said lever arm defined by an elongate arm having a free end and an actuating end and opposed side edges, and a locking member on the free end;
    a pair of spring arms integrally connected to the lever arm on opposite sides thereof adjacent said free end;
    a second body adjacent said first body, said second body movable relative to said first body;
    said lever arm movable between a first position in which said locking member engages said second body to pi vent relative movement between said first and second bodies, and a second position in which the locking member disengages from said second body so that said second body may be moved relative to said first body.

2. The actuator according to claim 1 wherein said first body comprises first and second opposed side walls held in a spaced-apart arrangement to define a slot therebetween, and said second body defines an implement movable in said slot between first and second positions, wherein said locking member engages said second body member and retains said second body member in the first position when said locking member is in said first position.

3. The actuator according to claim 1 wherein said lever arm and said spring member are formed of a unitary piece of material.

4. The actuator according to claim 2 wherein said side wall and said implement lock define a unitary piece of material.

5. The actuator according to claim 2 wherein said side wall and said implement lock define separate pieces of material that are affixed.

6. The actuator according to claim 1 wherein said lever arm is normally in the first position.

7. The actuator according to claim 1 including a fulcrum inwardly of said lever arm and intermediate along the length thereof.

8. The actuator according to claim 2 wherein said lever arm is carried by one of said side walls and is further defined by a substantially U shaped slot cut through said side wall to define an elongate lever arm having an actuating portion at one end thereof and a lifting portion at the opposite end, and wherein said slot further defines a pair of spring arms in said side wall, said spring arms integrally connected to said elongate lever arm.

9. The actuator according to claim 8 wherein said side wall is a unitary piece.

10. The actuator according to claim 8 wherein said side wall is defined by separate pieces that are affixed.

11. The actuator according to claim 8 including a second substantially U shaped slot cut through said side wall and oriented oppositely relative to and in an overlapping relationship with said first U shaped slot such that one of said U shaped slots is oriented inwardly of said other and such that the overlapping portions of the arms of said overlapping U shaped slots define said spring arms.

12. An actuating mechanism, comprising,
    a lever arm pivotally mounted to a first body and movable between a first position and a second position;
    a pair of spring arms laterally adjacent said lever arm and integrally connected to said lever arm on opposite sides thereof adjacent a free end of said lever arm such that said lever arm is normally in the first position and said spring provides resistance against moving said lever arm into said second position.

13. The actuator according to claim 12 wherein said lever arm and said spring member are formed of a unitary piece of material.

14. The actuator according to claim 12 including a fulcrum adjacent said lever arm and intermediate along the length thereof.

15. An actuating mechanism comprising,
    a unitary body member having a pair of substantially U shaped slots formed therein, each of said slots having opposite arm sections, and wherein said slots are oriented in opposite directions such that the opposite arm sections of one of said slots overlaps with the opposite arm sections of the other of said slots to define a lever arm and spring, said lever arm pivotally movable between a first position and a second position and said spring located laterally adjacent said lever arm;
    said spring integrally connected to said lever arm such that said lever arm is normally in the first position and said spring provides resistance against moving said lever arm into said second position.

16. The actuating mechanism according to claim 15 wherein said lever arm includes a free end and an actuating end, wherein said free end engages an adjacent member in said first position and releases said adjacent member in said second position.

17. An actuator comprising:
    a first body defining a longitudinal lever arm having opposed lateral edges, and first spring member integrally connected to said lever arm along one of said lateral edges and a second spring member integrally connected to said lever arm along the opposite lateral edge, said lever arm defining a free end and an actuating end, and said lever arm and spring members formed from a unitary piece;

a second body adjacent said first body such that said lever arm is movable between a first position in which said free end engages said second body and a second position in which the free end disengages from said second body; and a fulcrum in said second body intermediate along the length of said lever arm.

18. The actuator according to claim 17 wherein said body comprises a monolithic unitary piece of material.

19. The actuator according to claim 17 wherein the lever arm is defined by a first U shaped slot formed in said body.

20. The actuator according to claim 19 including a second substantially U shaped slot cut through said body and oriented oppositely relative to and in an overlapping relationship with said first U shaped slot such that one of said U shaped slots is oriented inwardly of said other and such that the overlapping portions of the arms of said overlapping U shaped slots define said spring arms.

21. The actuator according to claim 17 including a fluid port in said second body and wherein said actuator fluidly seals said fluid port when the lever arm is in the first position.

22. The actuator according to claim 21 wherein fluid pressure in said fluid port moves said lever arm into said second position.

23. The actuator according to claim 21 wherein said lever arm is in said first position when fluid pressure in said port is below a predetermined value.

24. The actuator according to claim 22 wherein said lever arm moves into said second position when fluid pressure in said port reaches a predetermined value.

* * * * *